Sept. 14, 1965    J. M. MEEK    3,205,715
ANGULAR RATE SENSOR UTILIZING AT LEAST ONE FLUID BEAM
Filed April 18, 1962    3 Sheets-Sheet 1

JAMES M. MEEK
INVENTOR

BY S. J. Rotondi, A. J. Dupont
& R. C. Lucke

Sept. 14, 1965   J. M. MEEK   3,205,715
ANGULAR RATE SENSOR UTILIZING AT LEAST ONE FLUID BEAM
Filed April 18, 1962   3 Sheets-Sheet 2
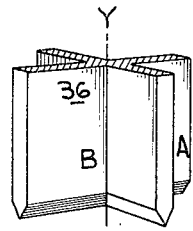
FIG. 4
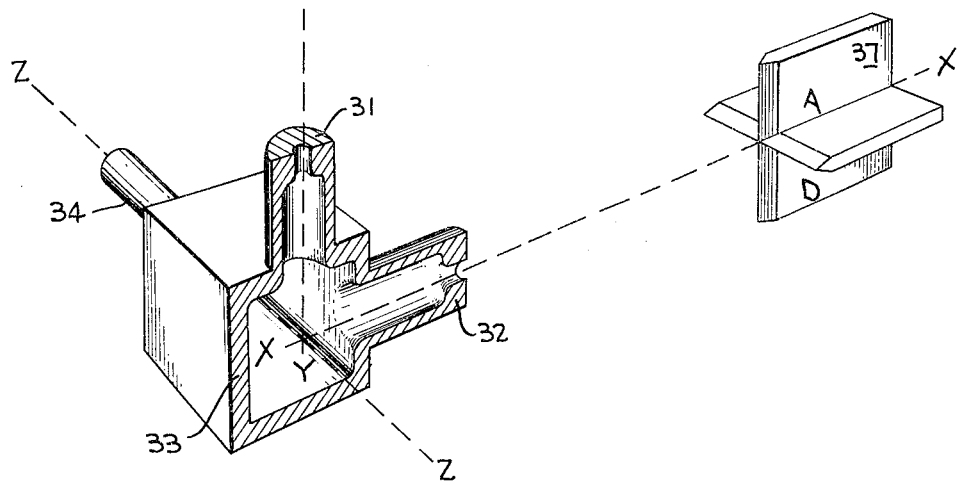
FIG. 5
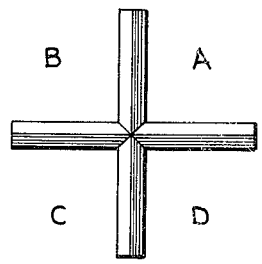
JAMES M. MEEK
INVENTOR
BY S. J. Rotondi, A. J. Dupont
& R. C. Lucke

3,205,715
ANGULAR RATE SENSOR UTILIZING AT LEAST ONE FLUID BEAM
James M. Meek, 1600 Atwood Road, Silver Spring, Md.
Filed Apr. 18, 1962, Ser. No. 189,249
7 Claims. (Cl. 73—516)
(Granted under Title 35, U.S. Code (1952), sec. 266)

The invention described herein may be manufactured and used by or for the United States Government for governmental purposes without the payment to me of any royalty thereon.

The present invention relates to rate measuring devices and more particularly to a device and apparatus for measuring the angular rate of rotation of a body about one or more of its axes.

It is an object of the present invention to provide an apparatus for measuring angular rate of rotation of a body which apparatus employs one or more beams of fluid and requires no moving parts other than the stream of fluid particles.

It is another object of the present invention to provide an apparatus for measuring angular rate of rotation of a body which apparatus may be rendered relatively insensitive to linear acceleration.

It is still another object of the present invention to provide an apparatus employing two beams of fluid directed at right angles to one another for determining the angular rate of rotation of a body about its three principal axes.

It is yet another object of the present invention to provide an apparatus for measuring the angular rate of rotation of a body about its three principal axes.

Still another object of the present invention is to provide an apparatus for measuring the angular rate of rotation of a body about its three principal axes, which apparatus is insensitive to linear acceleration along the major axis of linear movement of the body.

The above and still further objects, features and advantages of the present invention will become apparent upon consideration of the following detailed description of several embodiments thereof, especially when taken in conjunction with the accompanying drawings, wherein:

FIGURE 4 is a schematic view in perspective of an apparatus for measuring rates of rotation of a body about its three principal axes;

FIGURE 5 is a front view of a receptor employed in FIGURE 4; and

Figure 1:
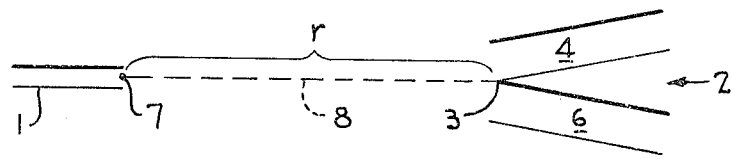
FIGURE 1 is a schematic diagram employed in describing the basic concepts of the present invention.

Referring now specifically to FIGURE 1 of the accompanying drawings, there is illustrated a schematic diagram employed in describing the principles of measurement of angular rate of rotation by means of a fluid beam. Fluid is supplied to a pipe 1 which causes a stream to issue along its center line towards a fluid catcher mechanism generally designated by the reference numeral 2. The beam of fluid may comprise a high pressure stream of air or other gas or may comprise water or other liquid. The catcher assembly 2 is provided with a V-shaped divider 3. The divider 3 is positioned along and symmetrical with respect to the center line of the nozzle 1 and the apex of the divider is directed toward and spaced a predetermined distance from the exit of the nozzle. Two receptor channels 4 and 6 are provided on opposite sides of the divider 2, the opposite walls of the divider providing one wall for each of the channels.

If it is assumed that the apparatus illustrated in FIGURE 1 rotates in the plane of the page about an axis 7 located along the center line of and at the exit of the pipe 1 then the arcuate distance traveled by the apex of the divider 3 during the fluid transit time, using this as a convenient reference, about the axis 7 is determined by the equation $$\Theta r = \frac{\omega r^2}{v} \tag{1}$$

where $\Theta r$ is arc length; that is, the distance separating the apex of the divider and the beam, $\omega$ is the angular rate of rotation about the axis 7, $r$ is the distance from the axis 7 to the apex of the divider 3 and $V$ is the velocity of the beam of fluid issuing from the pipe 1. The quantity $r$ is a fixed factor which in this case is the radius of the circle described by the apex of the divider 3 about 7. By making the velocity of the beam constant, Equation 1 becomes $$\Theta r = K\omega \tag{2}$$

It is seen that the arc distance between the apex of divider 3 and the fluid beam 7 is directly proportional to the angular velocity and that by measuring the arc length, the angular rate of rotation may be determined.

In operation of the device, assume initially that the apparatus is not rotating about the axis 7. Under these circumstances the beam issuring from the nozzle 1, flows along the center line designated by the reference numeral 8 and divides equally at the apex of the divider 3 so that equal fluid flows are established in the channels 4 and 6. By means to be described subsequently, information signals may be derived from the fluid flow in the channels 4 and 6 and compared in a differential amplifier which may be mechanical, electrical or pneumatic. Under the conditions described, wherein equal fluid flows are established in both channels, the differential signal is zero indicating that the apparatus is not rotating. If now the apparatus illustrated in FIGURE 1 rotates as a unit about the axis 7, then at the instant that the body begins to rotate, the fluid still traverses the path 8 but by the time it arrives at the apex of the divider 3, the apex will have moved, depending upon the direction of rotation, a predetermined distance as determined by Equation 2, this distance being a direct function of the angular rate of rotation. The quantities of the fluid entering the channels 4 and 6 are now different so that an output signal may be derived which is directly proportional to the displacement of the apex of the divider relative to the line 8. Since this displacement is directly proportional to angular rate of rotation, the output signal may be interpreted as a measure of this angular rate.

In the apparatus of FIGURE 1, the beam issuing from the nozzle 1 is always directed toward the apex of the divider 3 at the instant it issues from the pipe 1 and for constant rotational velocity the arcuate distance is constant. This arcuate distance is essentially independent of the location of the center of rotation. However, a difference in response is evident during angular acceleration which depends on the location of the center of rotation. It is not essential to the operation of the apparatus of the present invention to have the center of rotation at point 7. For instance, the axis of rotation may exist at some point to the left of the pipe 1, to the right of the divider, or at some point between the pipe 1 and the divider 3 or above or below the line 8, all as illustrated in FIGURE 1.

The deflection equation for constant angular acceleration with center of rotation at point 7 is:

$$\Theta = \Theta_0 + \Theta_A - \Theta_B \qquad (3)$$

$$\Theta = \frac{\omega_0 r}{V} + \left(\omega_0 T + \frac{1}{2}\alpha T^2\right) - \left[\omega_0 T + \frac{1}{2}\alpha(T-t)^2\right] \qquad (4)$$

$$\Theta = \frac{\omega_0 r}{V} + \alpha T t - \frac{1}{2}\alpha t^2 \qquad (5)$$

$$\Theta r = \frac{r^2\left[\omega_0 + \alpha\left(T - \frac{1}{2}t\right)\right]}{V} \qquad (6)$$

for $T > t$ where $\Theta_0$ is initial angular deflection due to constant rotational velocity, $\Theta_A$ is angular distance traveled by the apex in time T, $\Theta_B$ is angular distance traveled by the beam at circumference of radius $r$ in time T, T is the total time from the start of constant angular acceleration, $\omega_0$ is the rotational velocity of the apparatus at the start of angular acceleration, $\alpha$ is the angular acceleration of the apparatus, V is the velocity of the fluid beam emanating from the nozzle, $t$ is the transit time of fluid particles from nozzle to apex.

Figure 2:
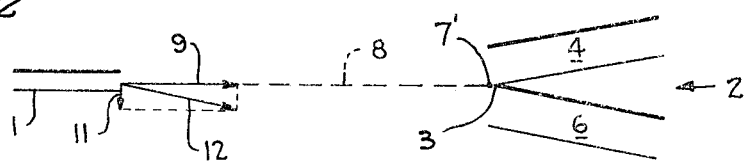
FIGURE 2 is a schematic diagram illustrating a variation of the system of FIGURE 1.

Now if the axis of rotation is removed from the axis 7 and the apparatus is caused to rotate and accelerate angularly about the apex, 7' in FIGURE 2, the effect can be explained as follows: It will be noted that the reference numerals for FIGURES 1 and 2 are the same where members designated thereby are the same.

If counterclockwise rotation is assumed then the fluid exiting from pipe 1 has two components of motion at the instant it exits. The first component which is designated by the reference numeral 9 is along the axis 8 and the second component, which is designated by the vector 11, is at right angles to the axis 8 and represents the tangential velocity of the fluid due to rotation about the axis 7' at the instant the fluid leaves the pipe 1. The vectorial sum of these two velocities is represented by the vector 12, and this vector represents the true direction of the stream as it leaves the pipe 1. It will be noted that the vector 12 is not directed at the apex of divider 3 but is displaced toward the channel 6 so that a greater proportion of the fluid enters channel 6 than enters channel 4. Now if the rate of rotation of the apparatus has changed then at the instant this occurs the fluid entering the receptor 2 bears a history of the prior tangential velocity of the rotating nozzle and it is not until the fluid exiting from the nozzle 1 at the instant of the change in velocity reaches the receptor 2 that the past history of the angular rate of rotation is completely eliminated. Under these circumstances, the tangential velocity at the nozzle will be $$V_T = V_0 + aT \qquad (7)$$

where $V_0$ is initial nozzle velocity due to constant rotational velocity and $a$ is the constant linear acceleration of the nozzle equal to $r\alpha$, $\alpha$ being the constant angular acceleration of the apparatus.

From this we can establish the corresponding tangential velocity of fluid relative to the instant center at the nozzle and at a radial distance $r$ from this instant center (adjacent to the apex). It is $$V_T = V_0 + a(T-t) \qquad (8)$$

for $T > t$ $$V_T = \frac{\Theta r}{t} \text{ also } t = \frac{r}{V} \qquad (9)$$

The arc distance is $$\Theta r = [V_0 + a(T-t)]t \qquad (10)$$

$$\Theta r = \frac{\omega_0 r^2}{V} + \alpha r t T - \alpha r t^2 \qquad (11)$$

$$\Theta r = \frac{r^2[\omega_0 + \alpha(T-t)]}{V} \qquad (12)$$

for $T > t$

The apparatus illustrated in FIGURES 1 and 2 are sensitive to linear acceleration but not to linear velocity. In the latter case, if the entire system is moving in a direction at right angles to the line 8 then the fluid exiting from the pipe 1 has a velocity perpendicular to the line 8 equal to the velocity of the apex of the divider 3 relative to the line 8 and equal division of fluid occurs in the absence of angular rotation. However, if the device is subject to linear acceleration, then during the interval required for the fluid to pass from the pipe 1 to the divider 3, the divider has acquired a higher velocity than the fluid had at the time of exit and the fluid is displaced with respect to the apex of the divider. The apparatus of FIGURES 1 and 2 may also be subjected simultaneously to angular acceleration. The total change $\Delta_T$ in position of the divider with respect to the fluid is expressed by an equation of the form $$\Delta_T = \frac{\omega r^2}{V} \pm \frac{1}{2}at^2 \pm \frac{1}{2}\alpha r t^2 \qquad (13)$$

which reduces to the equation $$\Delta_T = \frac{1}{2}(2\omega V \pm a \pm r\alpha)t^2 \qquad (14)$$

where $t$ for this case only is defined as being either transit time or total time of angular acceleration, whichever is pertinent.

In special situations, it may be desirable to employ a signal reflecting all terms of Equation 13. In the majority of systems, however, it is desirable to eliminate or at least reduce the effects of linear acceleration.

In accordance with one aspect of the present invention, the effects of linear acceleration on the system of FIGURE 1 may be greatly reduced by causing the numerical value of velocity of the beam to be at least twice and preferably an order of magnitude greater than the numerical value of expected maximum linear acceleration. The effects of linear acceleration on the system of FIGURE 1 are defined by the equation $$S = \frac{1}{2}a\left(\frac{r^2}{V^2}\right) \qquad (15)$$

where S stands for linear displacement, $a$ stands for acceleration, $r$ is the distance between the exit of pipe 1 and the apex of divider 3 and V is the velocity of the beam. This equation defines for a particular linear acceleration perpendicular to the axis of the pipe 1, the displacement of the apex of the divider 3 relative to the center line of the stream issuing from the pipe 1, during the interval required for a particle in the fluid beam to travel from the pipe 1 to the apex of the divider. Linear acceleration parallel to the axis of the pipe 1 has no effect upon the system and only those accelerations having a component perpendicular to the aforesaid axis must be considered.

Equation 1 expresses the arc distance traveled by the apex of the divider 3 due to a particular angular rate of rotation and by dividing Equation 1 by Equation 15 there is obtained the equation:

$$\frac{\Theta r}{S} = \frac{2\omega V}{a} \quad (16)$$

indicating the relative effects of angular motion and linear acceleration upon the displacement of the fluid relative to the apex of the divider 3. It will be noted that if the velocity of the beam V is quite large with respect to the maximum expected numerical value of linear acceleration, the displacement of the divider relative to the beam in response to angular velocity may easily be made two to ten times greater than the effect due to linear acceleration.

The effects of linear acceleration may also be eliminated by employing a linear accelerometer having its axis of response perpendicular to the axis of pipe 1. The signal produced by the linear accelerometer may be subtracted after appropriate scaling from the signals produced by the devices of FIGURES 1 and 2 to provide the desired results. The signals of the two devices would neessarily have to be in the same form at the time of subtraction and such signals may be fluid, electrical or mechanical.

The response of the system to angular acceleration is also affected by increasing the velocity of the beam, this having the effect of reducing the delay of transit of the fluid from the pipe 1, for instance, to the apex of the divider. Referring to Equation 9, it is seen that by increasing the velocity of the beam, the numerical value of the factor $t$ is decreased thereby changing the value of the portion of deflection due to angular acceleration and the portion due to linear acceleration, as seen in Equations 11 and 15. Therefore, it is possible by proper choice of fluid velocity $V_1$ and consequently transit time $t$, to regulate the relative sensitivity to angular acceleration and linear accelerations.

Figure 3:
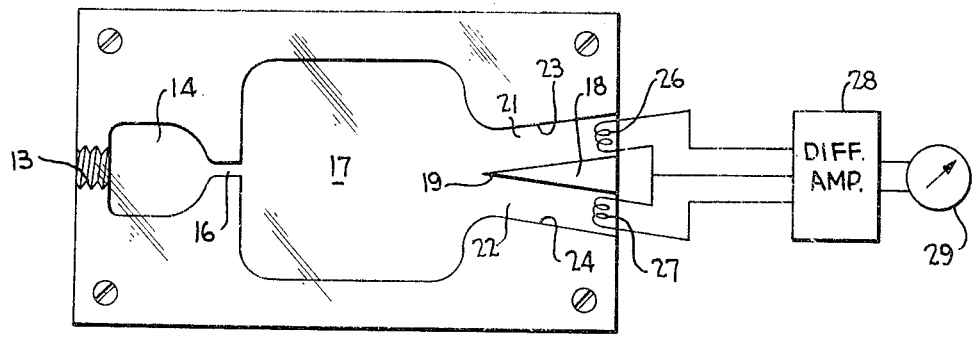
FIGURE 3 is a schematic diagram illustrating a practical embodiment of the apparatus of the present invention.

Referring now specifically to FIGURE 3, there is illustrated a planar view of an operative embodiment of the present invention incorporating a specific system for measuring the difference in the fluid signals developed in the two output channels of the apparatus. Fluid under pressure is applied through a suitable threaded coupling 13 to a chamber 14 which terminates in a nozzle 16 for ejecting fluid in jet or stream form into a chamber 17. A divider 18 has its apex 19 lying along the center line of the nozzle 16 and displaced therefrom by a suitable distance. The two sides of the divider 18 define a surface for each of two output channels 21 and 22 having a further side wall 23 and 24, respectively, to confine the fluid beam to the output channels. The device illustrated in FIGURE 3 has a predetermined thickness perpendicular to the plane of the page and may be enclosed between two solid plates so as to completely confine the apparatus and the fluid therein. Preferably the orifice 16 extends from plate-to-plate.

The channels 21 and 22 may exit into the surrounding atmosphere as illustrated in FIGURE 3 or may exit into a single channel which is returned to a fluid pump supplying fluid under pressure to the chamber 14 thereby to define a closed system. Depending upon the atmospheric conditions in which the apparatus is operating and more particularly upon the degree of evacuation or pressurization desired, the system may be open as illustrated in FIGURE 3 or may of necessity be closed.

A system of measuring the difference in flow in the channels 21 and 22 is also illustrated in FIGURE 3 and comprises a pair of hot wire anemometers 26 and 27 disposed in the channels 21 and 22, respectively. The electrical signals generated by the anemometers are connected via suitable leads to a differential amplifier 28 which develops an output signal proportional to the difference between the electrical signals generated by the hot wire anemometer systems. The signal generated by the differential amplifier 28 is schematically illustrated as being applied to a meter 29 but, of course, may be connected directly into an electrical measuring or control system.

The hot wire system is only one of several systems which may be employed and specifically the two passages 21 and 22 may exit into a pair of vertical liquid columns interconnected at their bottom ends to provide a liquid manometer system. The differential in liquid levels in the two columns determines the difference in signal. Similarly, photoelectric cell systems may be utilized by employing an opaque or at least translucent fluid as the operating fluid so that the amount of light intercepted by the fluid varies with the quantity of fluid entering the particular passage. A system employing a single photocell may be employed although a system employing two photocells is preferred. With regard to the hot wire anemometer system, such systems are quite conventional and normally each anemometer would be connected in a distinct impedance bridge or could be connected in different arms of the same bridge to provide the desired differential signal directly.

Referring now specifically to FIGURE 4 of the accompanying drawings there is illustrated a system employing two nozzles disposed at right angles to one another for measuring rotation of the apparatus about its three principal axes of rotation. The three principal axes of rotation of the device are designated as the X, Y and Z axes, and in conventional notation these three axes are mutually perpendicular to one another. The apparatus is provided with a pair of nozzles 31 and 32 which direct fluid streams along the X and Y axes, respectively. The nozzles 31 and 32 communicate with the interior of a hollow block 33 to which fluid under pressure is supplied via a supply tube or pipe 34. There are provided two receptor devices 36 and 37 each constituting a pair of plates which intersect at right angles with respect to one another and have their intersecting point aligned along an associated X or Y axis. Specifically, the receptor 36 has a center line aligned with the Y axis and the receptor 37 has its center aligned with the X axis. A front view of one of these devices is illustrated in FIGURE 5, the leading edge of each plate being beveled to provide knife edges on the plates which intersect at the center of the device.

The plates of the receptors divide the receptor region into four quadrants designated by reference letters A, B, C and D and under initial conditions; that is, in the absence of rotation of the device about any of its axes, the fluid divides equally at each of the receptors 36 and 37 between the quadrants A, B, C and D. Assuming for the moment that the apparatus is rotating about the Y axis in a clockwise direction, more fluid is directed to the A and D than the B and C quadrants of the receptor 37 but there is no change in the quantity of fluid reaching the various quadrants defined by the receptor 36. Similarly, if the apparatus rotates about its X axis there is no change in the quantity of fluid reaching the various quadrants defined by the receptor 37 whereas there is a change in the quantity of fluid reaching the various quadrants of receptor 36. For instance, if the apparatus rotates so that the upper end of the nozzle 31 is moved into the page on which the apparatus is illustrated, more fluid reaches the quadrants A and B of the receptor 36 than reaches the quadrants C and D. Finally, if the apparatus rotates about the Z axis then the quantity of fluid diverted to the various quadrants of both the receptors 36 and 37 is affected. If the rotation is counterclockwise about the axis Z then the amount of fluid reaching the B and C channels of the receptor 36 is increased and the quantity of fluid reaching the A and B quadrants of receptor 37 is increased. By appropriately comparing the various fluid signals, the angular rate of rotation for each condition may be determined. The arrangement of the measuring devices for determining rotation of the apparatus about its various axes is scheduled in Table I. To interpret the table, for one example, if there is rotation about the X axis than by measuring the difference in flow to the A and D quadrants of the receptor 36 one can determine the angular rate and direction of rotation. The measurement may also be made between the B and C quadrants of the receptor 36 or, in the alternative, both measurements may be made and the signals combined to provide a high amplitude signal. Of course, the receptor 36 provides no signal for rotation about the Y axis and similarly, the receptor 37 provides no signal for rotation about the X axis.

TABLE I

|  | X | Y | Z |
| --- | --- | --- | --- |
| Receptor 36 | A and D or B and C. |  | A and B or C and D. |
| Receptor 37 |  | A and B or C and D. | A and D or B and C. |

With regard to the Z axis, the receptor 36 provides a measurement between the A and B channels or the C and D channels and receptor 37 provides a measurement between the A and D or the B and C channels. Again all of these signals may be employed and properly combined to provide a maximum signal.

The apparatus of FIGURE 4 may also be rendered completely insensitive to linear acceleration along a predetermined axis of the system which is different from the X, Y and Z axes. If, for instance, the device were to be installed on a missile, the maximum axis of linear acceleration of the missile would be along the longitudinal or roll axis thereof. If the longitudinal axis of the missile lies in the X–Y plane of the apparatus of FIGURE 4 at an angle of 45° with respect to the X and Y axes of this system, the system is completely insensitive to linear acceleration of the missile along its principal or longitudinal axis.

Figure 6:
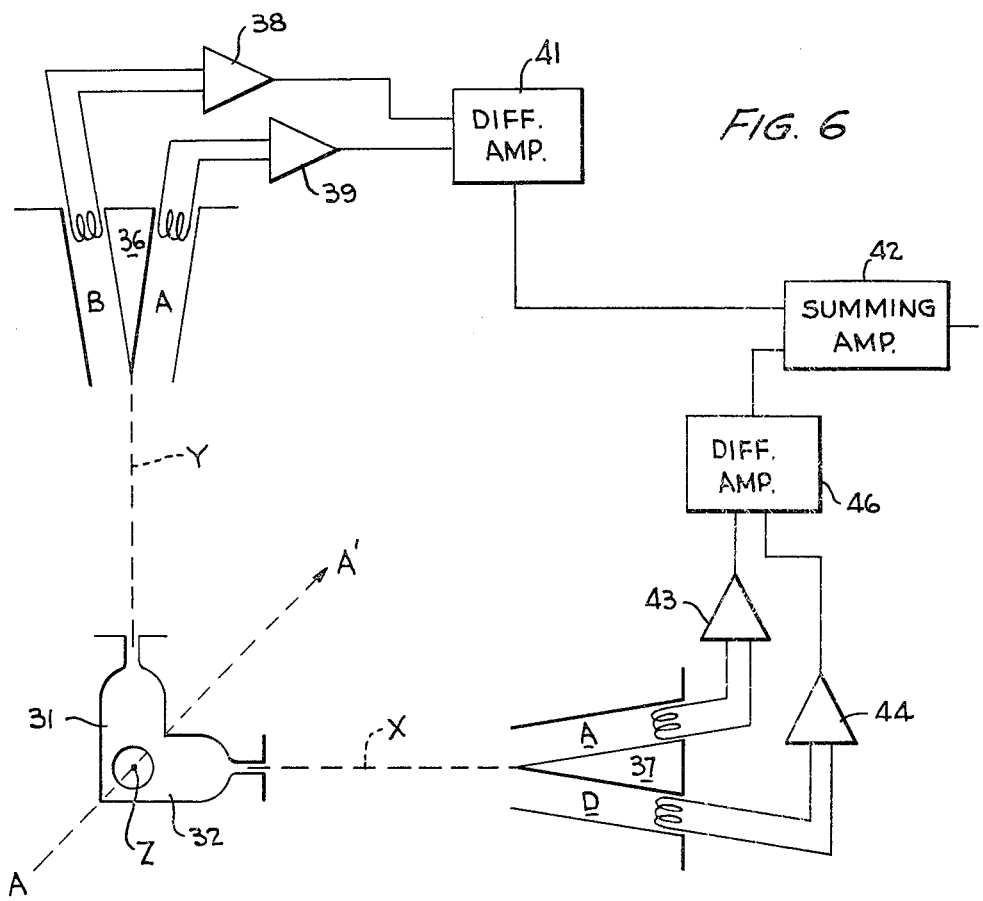
FIGURE 6 is a view in the X–Y plane of the apparatus of FIGURE 4.

Referring specifically to FIGURE 6, there is illustrated a two-dimensional representation of the apparatus of FIGURE 4 in the X–Y plane. The longitudinal center line of the missile or other vehicle lies along an axis A–A′ which is positioned at equal angles between the nozzle structures 31 and 32. If, now there is an acceleration along the axis A–A′ for instance toward the A′ letter in the drawing, the beams tend to diverge so that the passage or quadrant B, as illustrated in FIGURE 6, receives a greater portion of the fluid in the receptor 36 and the quadrant D of the receptor 37 receives a greater portion of liquid. Similarly, if the acceleration is in the direction towards the letter A of the axis A–A′ the channels A of both receptors 36 and 37 receive a greater proportion of fluid than the other channels. If the apparatus is concurrently rotated about the Z axis, and it is assumed that angular rate of rotation is in a counterclockwise direction, the A channel and the D channel, respectively, of receptors 36 and 37, receive the larger proportion of liquid as between their associated channels.

Referring again to Table I, it will be noted that in order to measure rotation about the Z axis, the difference between the A and B signals may be taken in the receptor 36 and the difference between the A and D signals in the receptor 37. If now these two signals are added, an output signal is produced representing the angular rotation about the Z axis. However, if the acceleration is linear then the differential signals relative to the A and B channels of the receptor 36 and A and D channels of the receptor 37 are equal but opposite and therefore when they are summed no signal is produced and the system has been rendered insensitive to linear acceleration along the principal axis of the vehicle so long as the axis A–A′ is aligned with the principal axis of linear acceleration of the device.

The apparatus of FIGURE 6 illustrates the system connections required to produce the result set forth above. The output signal from the channel B of the receptor 36, for istance as determined by a hot wire anemometer, is connected to a bridge amplifier 38 and the output signal developed by an anemometer associated with the A quadrant of the receptor 36 is applied to a bridge amplifier 39. A difference amplifier 41 develops a signal proportional to the difference between the signals available from the amplifiers 38 and 39 and provides a signal to a summing amplifier 42. The signals developed in the A and D channels of the receptor 37 are amplified respectively by bridge amplifiiers 43 and 44 and are supplied to a differential amplifier 46 which supplied to the summing amplifier 42 a signal proportional to the difference between the signals generated by the amplifiers 43 and 44.

Considering signal values relative to an arbitrary standard, if the output signal from amplifier 38 is greater than that produced by amplifier 39, it is assumed that a positive signal is produced by the differential amplifier 41. If the body is rotating, then the differential amplifier 46 also produces a positive signal since the signal generated by the amplifier 43 is greater than that generated by amplifier 44. These two values being both positive are summed in the amplifier 42 and produce a positive output signal. If linear acceleration is encountered for instance in the direction of the letter A, the signal generated in response to the flow to channel B of receptor 36 is greater than that generated in response to flow to channel A and the output signal of the differential amplifier 41 is again positive. The signal generated by the amplifier 44 is now greater than the signal generated by the amplifier 43 and the output signal from the differential amplifier 46 is negative. If linear acceleration has been precisely aligned with the axis A–A′, the absolute values of the signals generated by differential amplifiers 41 and 46 are equal and no output is generated by summing amplifier 42. Thus, the system is independent of linear acceleration along the axis A–A′. Linear accelerations along any other axis effect the measurements obtained, but as previously indicated by maintaining the relative value of velocity of the beam to the apparatus at least twice that of the maximum anticipated linear acceleration, or by employing a linear accelerometer, these effects may be maintained within acceptable limits or substantially eliminated.

In order to detect angular velocities about axes other than the Z axis, the principles illustrated in FIGURE 6 are employed. For instance, the output signal from amplifier 39 is further applied to a differential amplifier receiving a signal from a D quadrant flow measuring system to provide a measurement of rate of rotation about the X axis.

The apparatus of FIGURE 4 may employ all of the various methods of detection described herein and is not intended to limit such devices to the use of hot wire anemometers, these being described only for the purpose of ease of description.

It should be noted that a single nozzle and receptor combination is capable of measuring rate of rotation in two planes. For instance, nozzle 32 and receptor 37 may determine rates of rotation about the Y and Z axes. Reduction of effects of linear acceleration may be realized only by employing a high speed stream. The preferred-axis compensation of FIGURE 4 is not available in such a system.

While I have described and illustrated several embodiments of my invention, it will be clear that variations of the details of construction may be resorted to without departing from the true spirit and scope of the invention as defined in the appended claims.

What I claim is:

1. A device for measuring the angular rate of rotation of a body about its three principal axes, comprising a pair of nozzles for issuing two streams of fluid at right angles to one another, a pair of receptor devices, each disposed at a specific location a predetermined distance from each of said nozzles and dividing the space at said location into four equal quadrants relative to the axis of its associated nozzle, and sensing means associated with each receptor for measuring the difference in rate of flow of fluid to at least two of said quadrants arranged on one side of a plane lying at an angle to the axis about which rotation is to be detected by said sensing means.

2. The combination according to claim 1 wherein an axis lying in the plane of said nozzles and forming equal angles with the axes thereof is aligned with the principal axis of linear acceleration of said body.

3. The combination according to claim 2 further comprising sensing means associated with each of said receptors for developing a signal proportional to the difference between the rate of flow of fluid to two of said quadrants lying in the plane of said nozzles and means for adding said signals.

4. A device for measuring the angular rate of rotation of a body about its three principal axes, comprising a pair of nozzles for issuing two beams of fluid at right angles to one another, the axes of said nozzles each being aligned with a different principal axis of rotation of said body, a pair of receptor devices disposed at locations lying at predetermined equal distances from said nozzles, each of said receptor devices dividing said location into four equal quadrants symmetrical with respect to the axis of its associated nozzle, and sensing means associated with each of said receptors for measuring the difference in rates of fluid flow to at least two of said quadrants lying on the same side of a plane perpendicular to the axis of the nozzle associated with the other of said receptors.

5. The combination according to claim 4 further comprising sensing means associated with each of said receptors for developing a signal proportional to the difference between the rates of fluid flow to two of said quadrants lying on the same side of a plane including the axes of both of said nozzles.

6. A device for measuring the angular rate of rotation of a body about its three principal axes, comprising a pair of nozzles for issuing two streams of fluid at right angles to one another, a pair of receptor devices, each disposed at a specific location a predetermined distance from one of said nozzles and dividing the space at said location into four equal quadrants relative to the axis of its associated nozzle, and sensing means associated with each receptor for determining the position of said stream in two dimensions relative to the point of interaction of said four quadrants.

7. A device for measuring the angular rate of rotation of a body about two of its principal axes comprising a nozzle for issuing a stream of fluid, a receptor device disposed at a specific location of predetermined distance from said nozzle and dividing the space at said location into four equal quadrants relative to the axis of said nozzle and sensing means associated with said receptor for determining the position of said stream in two dimensions relative to the point of interaction of said four quadrants.

References Cited by the Examiner

UNITED STATES PATENTS

| | | | |
|---|---|---|---|
| 1,841,607 | 1/32 | Kollsman. | |
| 2,319,932 | 5/43 | Jacobs | 73—515 X |
| 2,718,610 | 9/55 | Krawinkel | 244—14 |
| 3,071,154 | 1/63 | Cargill et al. | 137—608 |

FOREIGN PATENTS

| | | |
|---|---|---|
| 331,878 | 1/21 | Germany. |

BENJAMIN A. BORCHELT, *Primary Examiner.*

MAYNARD R. WILBUR, *Examiner.*